April 29, 1958  A. B. DU MONT  2,832,821
DUAL IMAGE VIEWING APPARATUS

Filed Jan. 11, 1954  2 Sheets-Sheet 1

INVENTOR.
ALLEN B. DU MONT
BY Darby & Darby
ATTORNEYS

April 29, 1958     A. B. DU MONT     2,832,821
DUAL IMAGE VIEWING APPARATUS

Filed Jan. 11, 1954     2 Sheets-Sheet 2

INVENTOR.
ALLEN B. DU MONT

BY

ATTORNEYS

United States Patent Office 2,832,821
Patented Apr. 29, 1958

2,832,821

DUAL IMAGE VIEWING APPARATUS

Allen B. Du Mont, Cedar Grove, N. J., assignor to Allen B. Du Mont Laboratories, Inc., Clifton, N. J., a corporation of Delaware Application January 11, 1954, Serial No. 403,166

1 Claim. (Cl. 178—7.5)

This invention relates to dual image viewing apparatus, particularly for television images and the like and the simultaneous display of two distinct images on one picture area.

It is a primary object of the invention to provide improved multiple image viewing apparatus for television and the like.

Another object is to provide more compact and simplified viewing apparatus for the presentation of two separate television images, superimposed, to be viewed independently.

Other objects will be apparent after a study of the following specification together with the drawings in which.

In accordance with the invention two cathode ray tubes, to present an image such as a television image, are connected respectively to sources of different signals. The two tubes are mounted at an angle with respect to each other, preferably at 90°. A semi-transparent mirror is positioned between the two tubes and particularly the screens thereof, at an angle to bisect the 90° angle between the two tubes. Transparent polarized filter sheets are placed respectively over the screen of each tube with the angle of polarization of one of said sheets being at 90° with respect to the angle of polarization of the other of said sheets. The image on one of said tubes is visible through the mirror while the image on the other is visible as a result of reflection by the mirror, with the two images superimposed on the surface of the mirror. A sheet of polarized material positioned in front of the viewer then separates the desired from the undesired image. Two such sheets having different angles of polarization with respect to the viewing angle thus permit two or more persons to view, respectively, the images on one or the other of the tubes.

Figure 3:
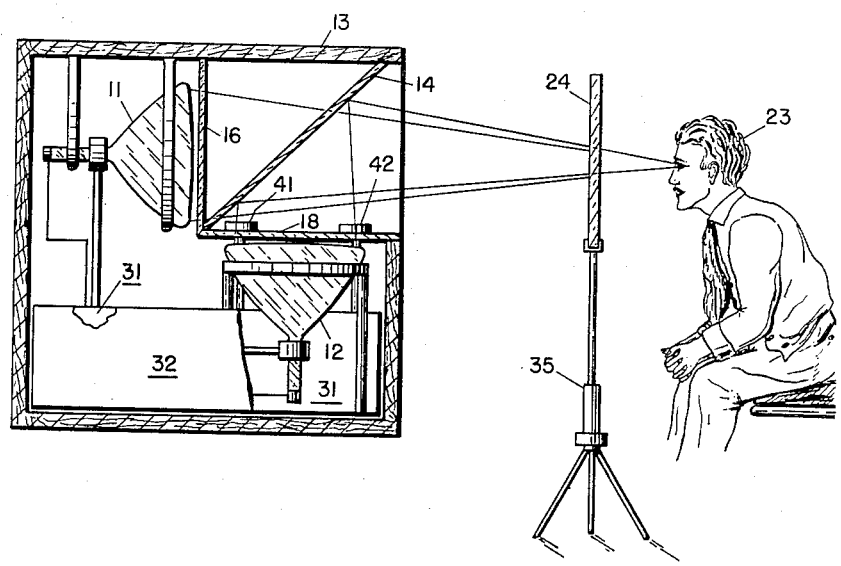
Fig. 3 is a cross-sectional view along the line 3—3 of the apparatus in Fig. 1.

Referring now to Fig. 3, it may be seen that the apparatus comprises a pair of cathode ray tubes 11 and 12 mounted at a 90° angle with respect to each other. Preferably, one tube 11 is mounted horizontally with the screen thereof lying in a vertical plane while the other tube 12 is mounted vertically with the screen thereof in a horizontal plane. The two tubes 11 and 12 are enclosed within a cabinet 13. The vertical and horizontal arrangement of the two tubes makes possible a cabinet of a width which may correspond closely to the width of the tubes. It is to be understood, of course, that the tubes may be placed both along a horizontal or other axis, with the viewing screens at a 90° angle with respect to each other.

A semi-transparent mirror 14 is positioned between the screens of the two tubes at a 45° angle, i. e., an angle bisecting the 90° angle of the screens of the tubes. Preferably the tubes are positioned so that a person may view the mirror 14 in alignment with the axis of one of the tubes 11, so as to view the image on the screen thereof through the mirror 14. In this way the other tube 12 is positioned so that the image therefrom is reflected by the mirror 14, the two images being superimposed upon the surface of the mirror.

A pair of sheets 16 and 18 of polarized material are placed in front of, so as to cover, the screens of the tubes 11 and 12 respectively. The angle of polarization of the first sheet 16 is preferably at an angle of 45° with respect to horizontal. The angle of polarization of the second sheet 17 is such as to cause the light therefrom, when reflected by the mirror 14, to be at an angle of 90° with respect to the first sheet 16, i. e., at a polarized angle of 45° with respect to the horizontal in the opposite direction from the first sheet 16.

A copending application to Charles E. Huffman, Serial No. 403,284, discloses that the rotation of the plane of polarization of light in passing through, or in being reflected by the mirror 14 should be corrected in viewing certain images. The manner of placing the sheets 16 and 18 so as to correct for the plane of polarization is claimed in the said application.

The image on one of the tubes 11 or 12 may be viewed by a person 19 (Fig. 1) through a sheet 21 of polarized material having an angle of polarization corresponding to that of the sheet 16 in front of the tube 11. In this way the image produced on the screen of the tube 11 is viewed through the mirror 14 and through the two corresponding sheets of polarized material 16 and 21. The polarized sheet 21 in front of the person 19 rejects the image from the tube 12 reflected by the mirror 14, and thus, while two images appear on the surface of the mirror 14, only one is viewed by the person.

The image on the screen of the other tube 12, reflected by the mirror 14, may be viewed by a second person 23 through another sheet 24 of polarized material. This latter sheet 24 has an angle of polarization corresponding after reflection, to that of the polarized sheet 18 covering the screen of the tube 12. The viewing sheet 24, while passing the image from the tube 12 as reflected by the mirror 14, rejects the image from the tube 11 as passed through the mirror, so that, as before, only one image is viewed by the person 23.

Thus, it is apparent that two persons seated in the same vicinity or room, or even side by side, may view on a single television apparatus two separate and distinct television images simultaneously. Two different television programs thus could be watched at the same time by two or more persons having different desires. Separate small earphones may be provided for individual sound.

Figure 1:
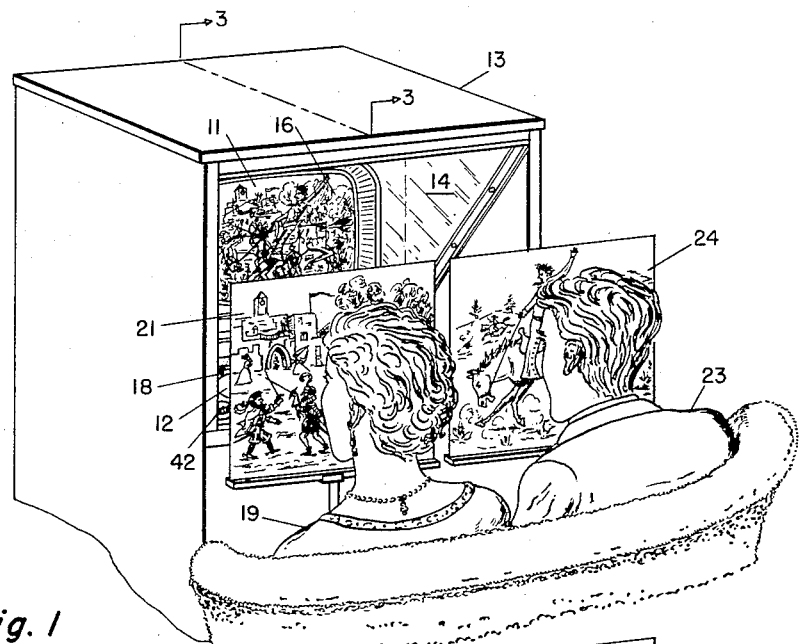
Fig. 1 is a perspective view of the apparatus in use in viewing television images.

The illustration of Fig. 1, which depicts two persons viewing two separate television programs at the same time, shows the images as appearing on the two sheets 21 and 24. It is to be understood that this is purely diagrammatic in order to illustrate the scenes which actually appear on the surface of the mirror 14 and which merely are viewed through the two sheets 21 and 24 of polarized material by the two persons shown.

Since the two tubes 11 and 12 present different images, as for instance, two different television programs, they are connected respectively to two television receiver circuits or chassis, as depicted in block form identified by the numerals 31 and 32. It is apparent that while the tubes are described as being connected to two separate chassis it is only necessary that the tubes be connected to independent sources of television signals and suitable circuitry might be mounted on a single chassis for the two television channels.

Similarly, the two tubes should be scanned by respective and separate synchronizing and scanning circuits, although it is to be understood that under proper conditions of synchronized transmission scanning may be accomplished for both tubes from a single source. The tubes are connected to their respective television signal sources and scanning circuits in the usual and well-known manner.

In Fig. 2 there are shown structures for mounting the polarized sheets 21 and 24 through which the spectators or persons view the images.

Figures 2A, 2B:
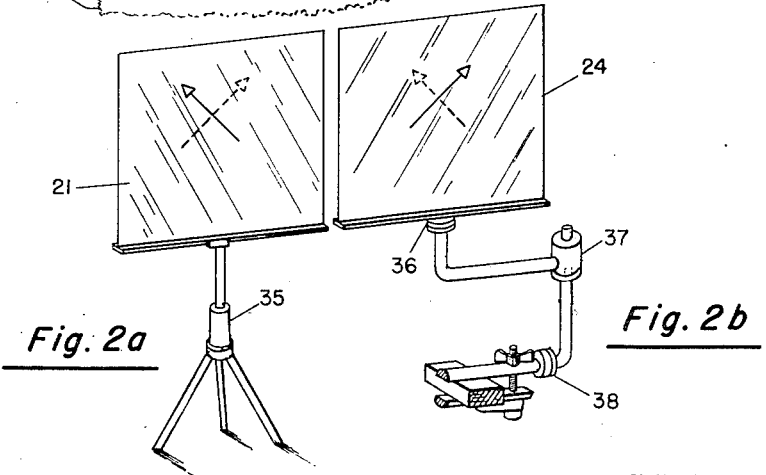
Figs. 2a and 2b show an analyzer to be used in viewing images presented by the viewing apparatus of Fig. 1, and different mounting embodiments therefor, respectively.

In Fig. 2a the polarized sheet 21 is shown as mounted on a rotatable tripod 35.

In Fig. 2b the polarized sheet 24 is shown mounted on a support adapted to be mounted on an additional support, such as for instance, the arm of a seat. A rotating member 36 is used to support the polarized sheet 24 so that it may be reversed if the viewer decides to watch the program presented on tube 11. In addition, a swivel connection 37 allows the entire sheet 24 to be swung out of the way and a second swivel connection 38 allows the analyzer 24 to be dropped to the side of the chair or sofa at times when it is not needed.

In both embodiments of mounting, the polarized sheet may be rotated so as to change the angle of polarization by 90°. The angles of polarization are depicted on each of the two sheets 21 and 24 in Fig. 2 by arrows which are in solid line when the sheets are in a first position and in dotted line indicating the angle of polarization when the sheets are reversed. In each instance the angle of polarization is preferable at 45° with respect to horizontal. Thus, either viewer may rotate his individual polarized sheet which might be termed an "analyzer" and thus change at will the image desired to be viewed, since the angle of polarization will in one instance pass a first image and reject the other, and when reversed, pass the second image and reject the first.

It is apparent that other mechanical structures may be used for supporting the analyzer sheets.

The television receiver circuits or chassis may be positioned within the housing 13 in any desired suitable space and preferably in such position providing ready mounting of control knobs 41 and 42 accessible either on the front of the housing or cabinet 13 or within the chamber formed by the mirror 14.

While the description herein has been devoted to television images, it is apparent that the principles can be applied equally as well to other images which normally can be viewed on a cathode ray tube, such as for instance, radar signals and the like.

While a particular or preferred embodiment of the invention has been described it will be apparent that modifications may be made without departing from the scope of the invention as defined by the following claim.

What is claimed is:

Television apparatus having a common image area on which two television images are simultaneously projected to be viewed separately by individual viewers, said apparatus comprising: a pair of cathode ray tubes having the respective fluorescent screens thereof located in mutually perpendicular planes, each of said tubes being individually fed by a complete self-contained and independent television receiver, each said receiver being connected to one of said tubes to energize said tubes simultaneously with separate independent and unrelated television image signals, said television images being made up of a plurality of lines which are so oriented on said screens as to appear substantially horizontal to each viewer; said common image area comprising a semi-transparent mirror located in a plane bisecting the angle formed by said mutually perpendicular planes, light from one of said fluorescent screens passing through said mirror and light from the other of said fluorescent screens being reflected from said mirror; first and second polarizing filter sheets covering said screens respectively, the planes of polarization of said sheets being such that the light passing through said mirror is polarized in a plane perpendicular to the light reflected by said mirror; means to provide two separate and unrelated television images, said means including first and second polarizing analyzers, one of said polarizing analyzers being located in the line of vision between each viewer and said mirror and having its plane of polarization oriented to pass the light from only one of said screens, said planes of polarization of said polarizing filter sheets and of said analyzers being oriented at substantially a 45° angle with respect to said lines forming said television images; and means comprising a rotatable holder to rotate each said analyzer about an axis at a 45° angle with the plane of polarization of each said analyzer.

References Cited in the file of this patent

UNITED STATES PATENTS

| | | |
|---|---|---|
| 2,514,828 | Ayres | July 11, 1950 |
| 2,672,502 | Albright | Mar. 16, 1954 |
| 2,677,722 | Bedford | May 4, 1954 |